Patented Nov. 1, 1932

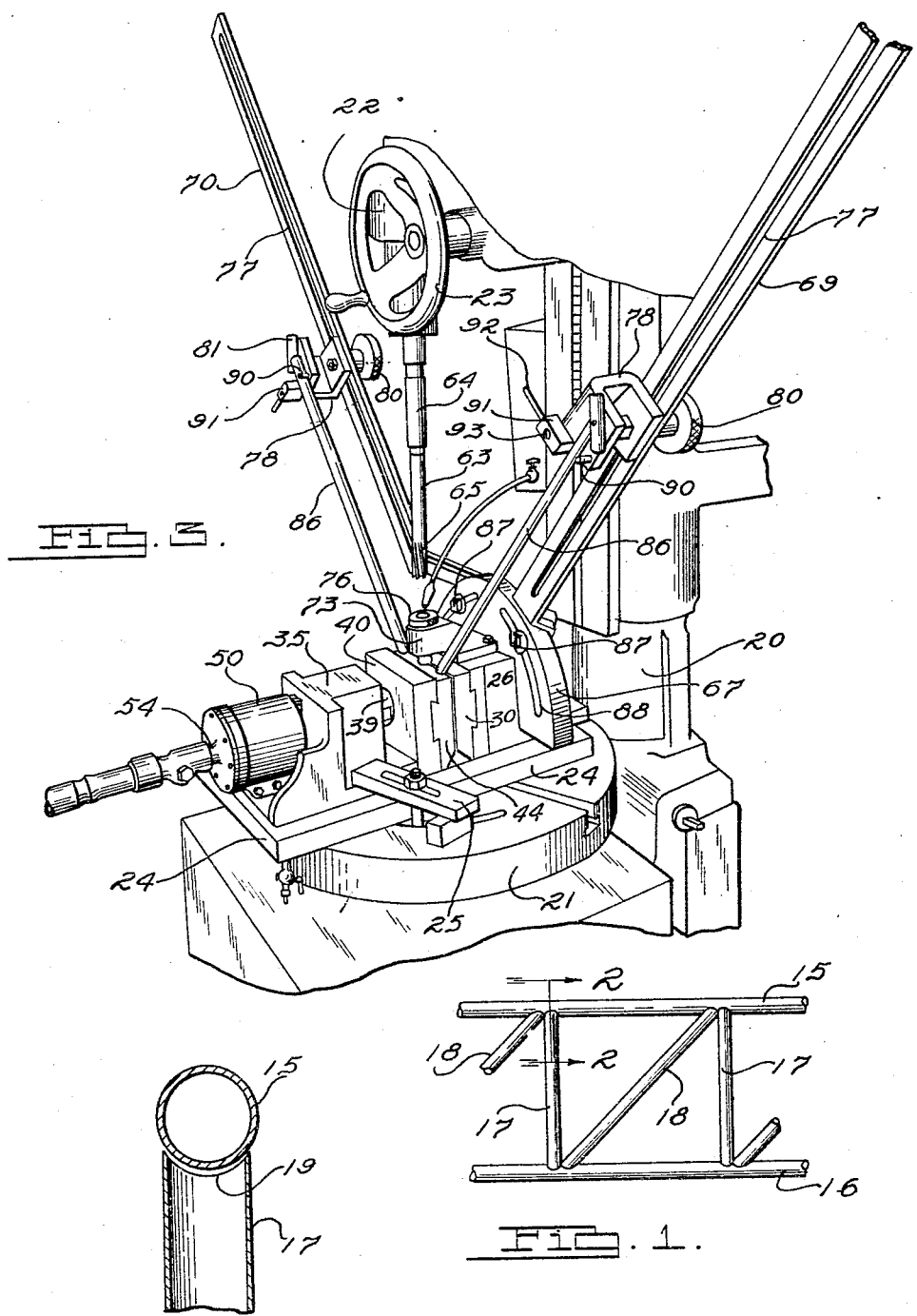

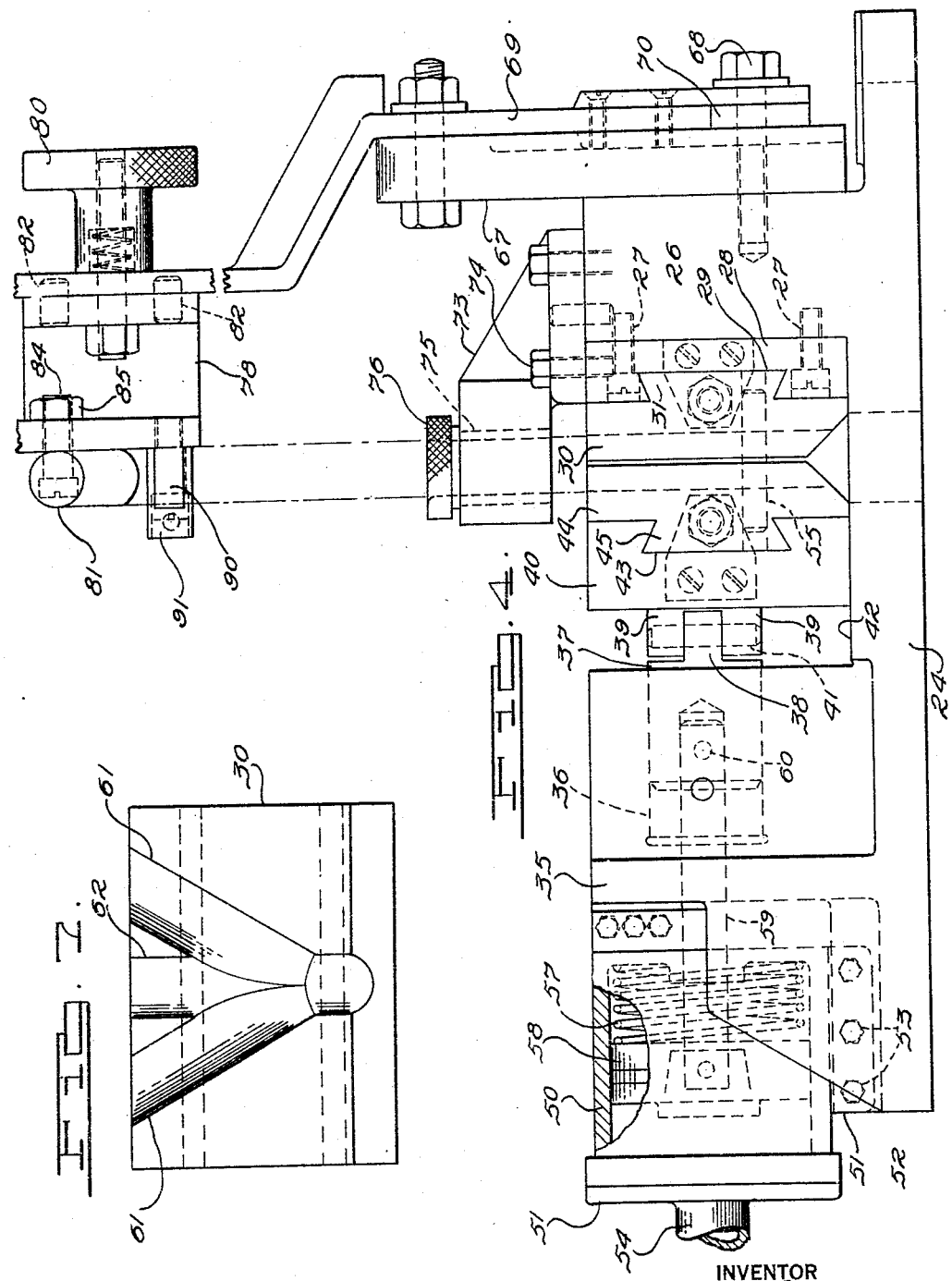

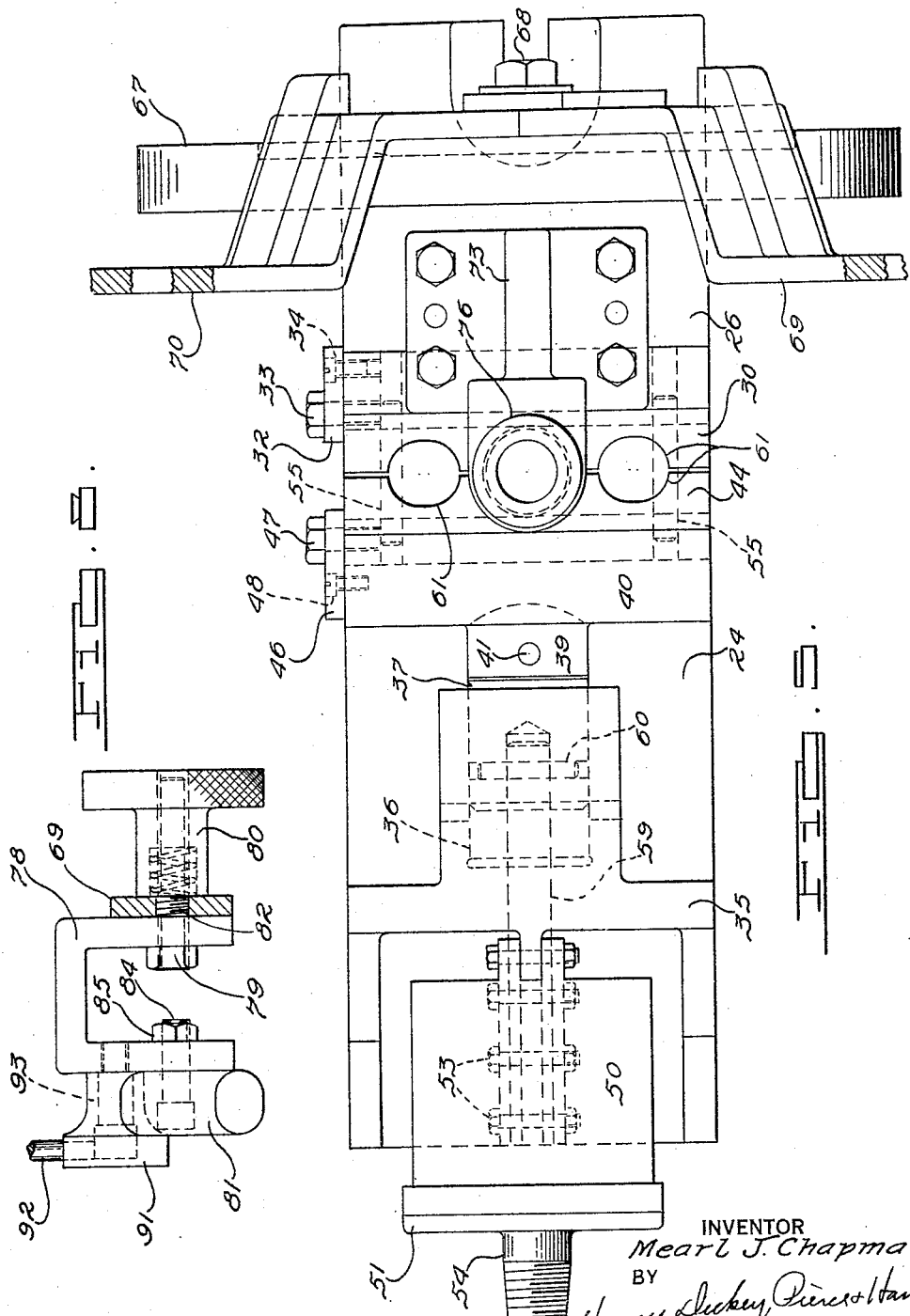

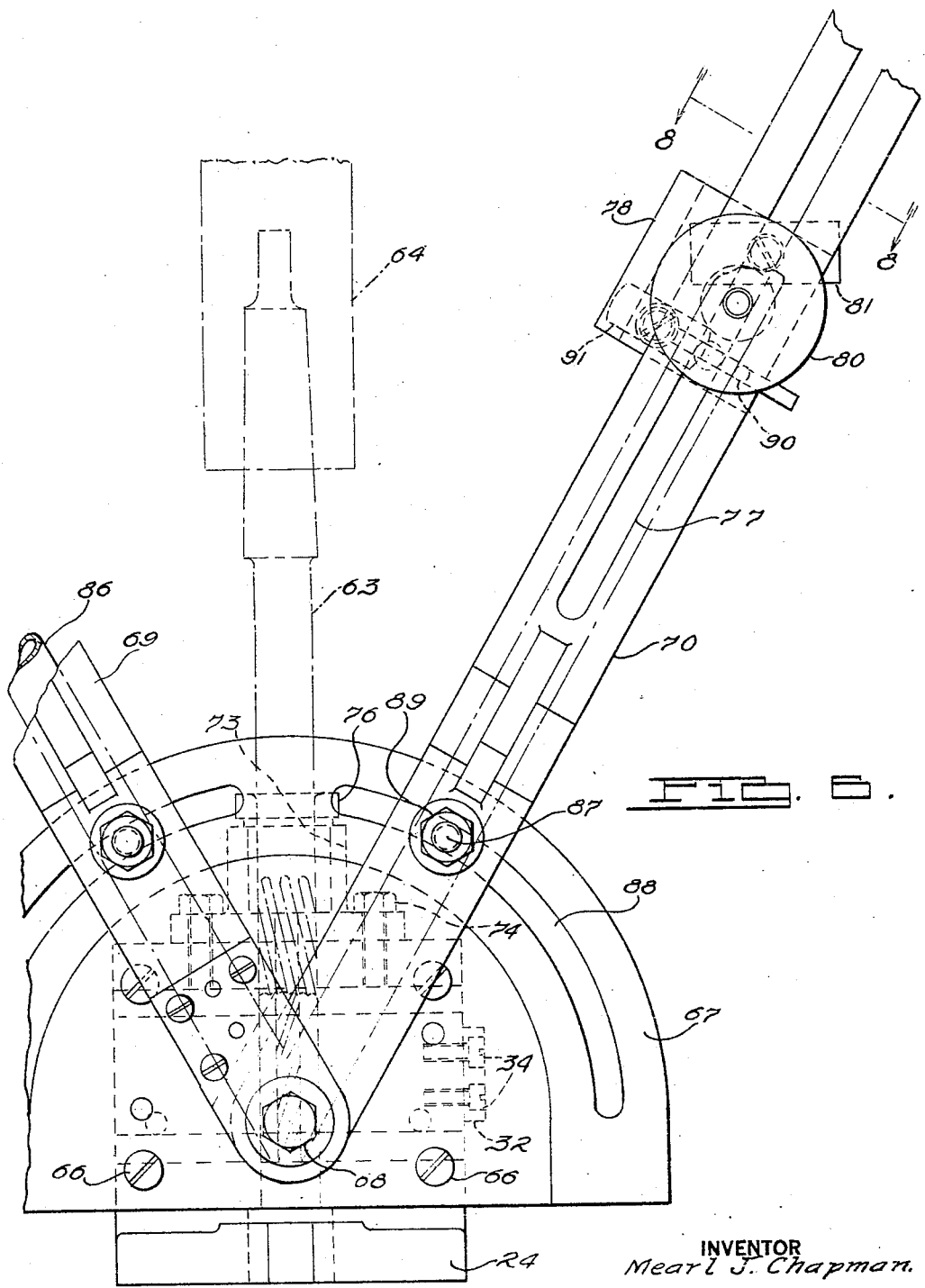

1,886,082

UNITED STATES PATENT OFFICE

MEARL J. CHAPMAN, OF CLEVELAND, OHIO, ASSIGNOR TO GREAT LAKES AIRCRAFT CORPORATION, A CORPORATION OF DELAWARE

RADIUS FORMING FIXTURE

Application filed April 8, 1930. Serial No. 442,709.

This invention relates to a fixture for forming a radius on the end of a tube, the principal object being the provision of a fixture by which a concavity having a predetermined and true radius may be formed at a desired angle on an angle on a work unit such as a tube or rod in an easy, accurate and economical manner, by an ordinary or special drill bit or reamer or other drill-type cutting tool axially advanced.

Another object is the provision of a fixture for forming a radius in a tube end at any desired angle with respect to the axis of the tube.

Another object is the provision of a fixture for use in forming a radius on a tube end and provided with means for accurately locating the radius at a predetermined distance from the opposite end of the tube and with its axis at a predetermined angular relation with respect to that of a radius formed on such opposite end.

Another object is the provision of a device of the type described in which a plurality of tubes may be operated upon simultaneously.

The above being among the objects of the present invention, the same consists in certain novel feature of construction and combination of parts to be hereinafter described with reference to the accompanying drawings, and then claimed, having the above and other objects in view.

In the accompanying drawings which show a suitable embodiment of the present invention, and in which like numerals refer to like parts throughout the several different views, Fig. 1 is a more or less diagrammatic fragmentary side elevation of the framework for an airplane fuselage showing tubular members whose ends are provided with a radius in order to better fit the co-acting tubes, and which radius may be easily and accurately formed by the fixture herein described.

Fig. 2 is a vertical section taken on the line 2—2 of Fig. 1.

Fig. 3 is a fragmentary perspective view showing a suitable embodiment of the present invention mounted upon a drill press.

Fig. 4 is an enlarged side view of the fixture shown in Fig. 3.

Fig. 5 is a plan view of Fig. 4, the supporting arms for the outer ends of the tube being broken off.

Fig. 6 is a rear view of the fixture.

Fig. 7 is a face view of one of the clamping members.

Fig. 8 is an end view of one of the supports for the outer ends of the tubes, taken as on the line 8—8 of Fig. 6.

It is common practice to form the framework of the fuselage or other parts of an airplane of hollow metal tubes in order to obtain maximum strength with minimum weight. In forming such framework, it is, of course, necessary that the various tubes be secured to each other by a joint providing maximum strength and of the least possible weight. The conventional method of doing this is to form a radius in the end of one of the tubes corresponding to the curvature of the tube to which it is to be joined, so that such tube end will fit the surface of the tube to which it is to be joined, and such tube is thereafter welded or brazed to the connecting tube along the line of contact between them. This construction is illustrated in Figs. 1 and 2. In these figures the tubes 15 and 16 may be considered as the upper and lower main frame members or longérons on one side of a fuselage. The tubes 15 and 16 are conventionally secured together by a plurality of vertically extending longitudinally spaced tubes 17 and also by a plurality of diagonally extending tubes 18. As illustrated in Fig. 2, the ends of the tubes 17 are formed with a radius 19 corresponding with the curvature of the exterior surface of the tubes 15 and 16, so that when placed in position the end of the tube 17 will have a continuous and unbroken contact with the surface of the tube 15. It will be understood that in Fig. 2 the tube 17 is shown as being slightly spaced from the tube 15 merely for the purpose of better illustrating the construction, and that in practice the end of the tube 17 contacts directly against the tube 15. The ends of the tubes 18 are provided with a corresponding radius, but the axial line of the radiused surface will, of course, extend at an angle to the axis of the tubes 18 corresponding with the angle desired between the tubes 18 and the tube 15, instead of being perpendicular thereto as in the case of the tube 17. It will also be apparent that this angularity of the radiused end surface on the various tubes will vary throughout the framework, and the angularity of the radiused surfaces at opposite ends of the same tube may vary from each other under different conditions.

In order to realize the maximum strength in the joint between two tubes thus joined, it is necessary that the contact between the radiused end of one tube and the surface of the tube to which it is joined be complete and continuous before the welding or brazing operation, and in order to insure such complete contact it is necessary that the radiused surface be accurately formed. It will also be apparent that inasmuch as such tubes often act as spacers between two other tubes, it is necessary that the radiused surfaces at the opposite ends of such tubes be accurately spaced from each other, and that the relation between the axial lines of the radiused surface at opposite ends of such tubes be accurately controlled. The fixture herein shown and described is designed to maintain this accuracy throughout.

Referring to the accompanying drawings, and particularly to Fig. 1, I show in a more or less diagrammatic manner a drill press upon which the device is mounted, the drill press being provided with the usual column 20 carrying the table 21 and vertically adjustable drill head 22 controlled in its vertical movement by the hand wheel 23. It will be understood that any type of drilling machine may be employed, or that the device may be applied to a milling, boring or other machine in which the desired movement between the work and the cutter may be effected.

The fixture itself includes a base 24, shown as being secured directly to the face of the table 21 as by clamping bars 25, although any suitable means may be employed, for this purpose. The base 24, adjacent the back end thereof, is provided with a rigid upstanding head 26. Secured to the forward face of the head 26 by screws such as 27 is a block member 28 provided with a horizontally extending dovetailed groove 29 across the face thereof. To provide one of two co-operating replaceable members of a central clamping means, a clamping member 30 is secured to the face of the block 28 by means of the tongue 31 which fits into the dovetail groove 29. A bar 32 and co-operating screws 33 and 34 serve to prevent displacement of the tongue 31 laterally of the block 28 in the groove 29.

Spaced outwardly of the head 26 on the base 24 is a second head 35 formed integrally with the base 24. The head 35 is provided with a central bore 36 extending perpendicularly with respect to the face of the clamping block 30, and slidably received in the bore 36 is a plunger 37. The right hand end of the plunger 37, as viewed in Figs. 4 and 5, is provided with a tongue 38, which is embraced on opposite sides by the lugs 39 formed on the rear face of a block 40, the tongue 38 and lugs 39 being connected together for simultaneous movement by a pin 41 which permits a limited amount of swiveling of the block 40 on the end of the plunger 37. The lower face of the block 40 rests against and is slidably positioned relative to the horizontal surface 42 formed on the base 24, and which serves, in effect, as a slide for the block 40. The rear face of the block 40 is provided with a dovetailed groove 43, and a clamping block 44 complementary to the clamping block 30 is secured to the block 40 by the tongue 45 which is fitted within the groove 43. As indicated in Fig. 5, a bar 46 and co-operating screws 47 and 48 serve to maintain the clamping block 44 against movement longitudinally of the groove 43.

Immediately outwardly of the head 35 is positioned a cylinder 50 in axial alignment with the bore 36. The cylinder 50 is shown as being secured to the base 24 by means of a pair of downwardly extending spaced flanges 51 which fit over and in which is received an upstanding flange member 52 formed integrally with the base 24, the flanges 51 and 52 being secured to each other by means of bolts such as 53. The cylinder 50 is provided with a head 51 which is provided with a fluid pressure inlet 54.

As indicated in Fig. 4, a coil spring 57 is held under compression between the righthand end of the cylinder 50 and the corresponding face of the piston 58 which works therein. The spring 57 constantly urges the piston 58 to the left as viewed in Figs. 4 and 5. The piston 58 is provided with a piston rod 59 which may be secured thereto in any suitable manner and which extends to the right, as viewed in Figs. 4 and 5, concentrically with the bore 36 into which it projects and where it is received within the plunger 37 to which it is secured by any suitable means such as the pin 60.

From the foregoing it will be apparent that the spring 57 acting upon the piston 58 and constantly urging the piston 58 to the left, as viewed in Figs. 4 and 5, acts through the piston rod 59, plunger 37 and block 40 to separate the clamping block 44 from the clamping block 30. Thus, in order to clamp an object between the blocks 30 and 44 all that is necessary is to introduce air or other fluid under pressure into the cylinder through the connection 54 and the pressure exerted thereby against the piston 58 will overcome the force of the spring 57 and move the piston and, consequently, the clamping block 44 towards the block 30. Upon release of such pressure the spring 57 will return the parts to their inoperative position as previously described. It will be obvious that instead of employing the spring 57, a conventional type of double acting cylinder in which fluid pressure may be admitted to either side of the piston may be employed instead of the construction shown in order to move the clamping block 44 as described. Dowels such as 55 are preferably secured in either one of the blocks 30 or 44 and are slidably received within the other of such blocks, these dowels being positioned with their axes parallel to the path of movement of the block portion and serve to insure proper co-operation between the blocks 30 and 44 in their clamping movement.

In the present case the clamping blocks 30 and 44 are referred to as comprised in central means adapted to clamp tubes such as 16, 17 or 18 between them while they are being operated upon to form their ends to the desired curvature. For this purpose each block 30 and 44 is provided with one or more semi-cylindrical recesses in their faces in which one of the ends of the tube to be operated upon is adapted to be located and clamped during the machining operation upon it. Inasmuch as these recesses and both the blocks 30 and 44 must be identical with each other except reversed in position from each other, so that opposing recesses in each block lie in complementary relation to the recesses in the other block, a description of one block 30 will be given, thereby explaining the construction of both blocks. Referring to Fig. 7 it will be noted that two semi-cylindrical grooves 61 are formed in the face of the block 30. In the particular form shown the recesses 61 extend downwardly and inwardly into converging relationship adjacent the vertical centerline of the block. These recesses are each adapted to receive therein the ends of one of the tubes to be machined and it will be apparent that when such tubes are clamped within the recesses 61 they will be maintained at a predetermined angle with respect to the side and top faces of the block. A third semi-cylindrical recess 62 is arranged with its axis vertical and in intersecting relation with respect to the point of intersection of the axes of the recesses 61. This recess 62 co-operates with the corresponding recess in the block 44 to provide a vertical opening in which the tool employed for machining the end of the tube is received and guided.

This tool is illustrated in dotted lines in Fig. 6 as at 63 and its upper end is socketed and driven by the chuck member 64 of the drill press. The lower end of the tool 63 is provided with cutting edges 65 on its side and lower ends. The diameter of this part of the tool is formed to the identical diameter of the tube to which the ends of the tube received in the recesses 61 are to fit and to which they are to be joined. Furthermore, the angle between the axis of the recess 62 and the axes of the recesses 61 corresponds to the angle between the axes of the tubes which are received in the recesses 61 and the axis of the tube to which they are to be secured. Consequently, with this construction, when the tubes are secured within the recesses 61 and the tool 63 is moved downwardly so as to fully machine the ends of such tubes, such ends will be machined to a curvature which will closely and accurately fit the tube to which they are to be joined.

It will be apparent, of course, that the angle which the axis of one of the recesses 61 makes with the axis of the recess 62 does not need to be the same as the angle which the axis of the other recess 61 makes with the axis of the recess 62, as shown in Fig. 7, but that in practice the angle of one may be the same or different from the angle of the other recess and the angle of either of the recesses may be varied to produce the proper curvature of the ends of the tubes being machined whatever the angle it may have with respect to the tube to which it is to be joined. Furthermore, either one recess such as 61, or more than two recesses may be provided in a single block such as 30 and its corresponding block such as 44, the particular number employed being merely a question of choice. It will be apparent of course that the number of recesses 61 in a single block such as 30 is necessarily limited by the size of the block and the face area thereof, consequently I prefer to provide a plurality of matching blocks such as 30 and 44, each of which is provided with grooves such as 61 and in which the angle between the groove 61 and the axis of the groove 62 is different, with such difference being in accordance with the difference in an angle between various tubes employed on the object to be formed. Furthermore, it will be apparent that where tubes of different sizes are to be machined, blocks such as 30 and 44 having a recess 61 of a corresponding diameter will normally be necessary for each difference in size of tube. Furthermore, it will be apparent that one size of tube may be joined to tubes having different diameters and in such case blocks having recesses 62 corresponding in diameter to the diameter of the tubes to which such machined tubes are to be joined will usually be provided.

In order to properly guide the tool 63 during its cutting operation and also to insure proper alignment of the tool with the recess 62 a bracket 73 is secured to the upper face of the head 26 by bolts such as 74. This bracket is provided with a vertically disposed opening 75 whose axis coincides with the axis of the recess 62 in the block 30. Within the opening 75 is removably received a bushing 76 whose bore slidably receives the shank of the tool 63 and thereby guides such shank.

A number of bushings 76 will of course ordinarily be provided and the bore of each will correspond with the diameter of the particular tool 63 being employed. Such bushing 76 might be depended upon for maintaining the tool in proper relationship with respect to the lower end of the tube being machined regardless of the particular size of the recess 62 in each case, but it is ordinarily preferable to provide blocks in which the recesses 62 also conform to the diameter of the tool 63.

It will also be apparent that two or more tubes may be simultaneously machined in this device where the recesses 61 are properly arranged with respect to each other or where the ends of the tube are properly cut before the curve forming operation.

Where the tubes to be machined are of considerable length it is preferable to provide some means for properly supporting the outer end thereof. Further, where such outer ends have already been formed to the proper curvature it will be obvious that it will be necessary that the axis of the curvature of such ends bear a predetermined relation, or be arranged at a predetermined angle with respect to the angle of the curvature which is to be formed at the lower end of the tube, as viewed axially of the tube. It will also be obvious that in forming the radius or curvature of the end of the tube whose opposite end has already been formed with a curvature, the distance between the opposite curved ends of the tube should be maintained within a predetermined limit. These things are taken care of in the following manner.

To the rear end of the head 26 I secure by bolts or screws such as 66 a vertically disposed semi-circular plate 67. To the rear face of this plate 67 I pivotally secure by means of the bolt 68 an elongated arm 69. The axis of the bolt 68 is so arranged that if it were extended it would intersect the point of intersection of the recesses 61 and 62, and consequently the arm 69 can be considered as being pivotable about such point of intersection. The lower end of the arm 69 is yoked and within the yoked end thereof and pivoted upon the screw 68 is a second arm 70. As both of these arms 69 and 70 are identical in construction except at their lower ends where they are connected to the screw 68, but one arm will be described, it being understood that the other arm is identical in all respects.

As indicated best in Figs. 3 and 6, it will be noted that the arm 69 is provided with a longitudinally extending slot 77 therein which extends from a point adjacent the plate 67 to a point adjacent the outer end of the arm. Referring now to Fig. 8, a rigid U-shaped member 78 is slidably and adjustably secured to the arm 69 by means of a bolt 79 which slidably passes through the slot 77 and which is engaged by a hand nut 80 on the opposite side of the arm 69. A pair of pins 82 secured in the side of the member 78 are slidably received in the slot 77 so as to maintain the member 78 against relative rotation about the bolt 79. It will be apparent that by loosening the nut 80 the U-shaped member 78 may be moved up and down the arm within the limits of the slot 77, and that it may be locked in any position along the arm 69 by tightening up the nut 80 so as to clamp the arm 69 between the U-shaped member 78 and the nut 80.

A short length of cylindrical bar 81 is secured to the side of the U-shaped member 78 opposite the nut 80 by means of a stud 84 and nut 85. The bar 81 may be rotated about the axis of the stud 84 and be clamped in rotatably adjusted position by the nut 85. The distance between the sides of the U-shaped member 78 is so arranged that the axis of the bar 81 lies in the same plane as the axes of both the depressions 61 and 62 in the plate 30. A number of bars 81 may be provided, each one being of the same diameter as one of the tubes, such as 15 or 16, which the tubes being machined must fit.

In operation, assuming that the tube has already been machined on one end, and assuming that the tube 86 in Fig. 1 is the tube now under discussion, the arm 69 is first swung about the axis of the bolt 68 until its longitudinal centerline is in alignment with the axis of one of the depressions 61 in the block 30, and is then clamped in such position by means of a bolt 87 which extends through the arm 69 and an arcuate slot 88 in the plate 67, permitting turning of the arm without disengagement of the bolt 87 from the plate 67, and is locked in place by means of the nut 89. The nut 85 is then loosened and the bar 81 is turned about the axis of the stud 84 until it is at the proper angle to the axis of the depression 62, and is then clamped in such position by the nut 85. The nut 80 is next loosened and the member 78 is moved outwardly or inwardly in the slot 77 until the bar 81 is at the required distance from the axis of the depression 62 in the block 30. In other words, by assuming the depression 62 as one of the tubes which one end of the tube 86 must fit, and the bar 81 as the other of the tubes which the tube 86 must fit, and by arranging the bar 81 at the same angle with respect to the axis of the depression 62 as the angle between the axes of the tubes inter-connected by the tube 86 in actual operation, and by then turning the tube 86 about its own axis until the curved end thereof properly fits the curvature of the surface of the tube 81 we are assured, when the tool 63 is passed down through the depression 62 so as to machine the lower end of the tube 86, that both ends of the tube 86 will be machined at the correct radius or curvature, that the relative angle of these curved ends with respect to each other will be substantially perfect, and that the tube will be of the correct length.

Means are preferably provided in conjunction with the bar 81 to insure the upper end of the tube 86 contacting against the bar 81 in the correct relative location between its ends, thus eliminating any inaccuracies that might otherwise occur due to a slight bend in the tube, or other causes. This means comprises a pin 90 projecting out from the side of the member 78 and against which the upper end of the tube 86 is adapted to bear. A cam member 91, provided with a handle 92 and pivotally secured to the side of the member 78 by a pin such as 93 is preferably provided forcing down the upper end of the tube 86 into contact with the pin 90 and for holding it in such position during the machining operation. Where neither end of the tube has yet been machined, then the member 78 may be moved outwardly on the arm 69 sufficiently to eliminate contact of the outer end of the tube 86 with the bar 81, and the pin 90 and cam 91 be employed for locating the upper end of the tube in correct position relative to the arm 69.

The arm 70 is of course provided with a member 78, bar 81, pin 90 and cam 91 in the same manner as above described in connection with the arm 69 so that two tubes may be simultaneously machined in one operation. It will be apparent, of course, that when a block 30 is employed having depression 61 at an angle with respect to the depression 62 different from that shown, the arms 69 and 70 are shifted on the plate 67 about the axis of the bolt 69 to correspond with such depression, this being done by loosening the nut 89, swinging the arm to position, and then retightening the nut 89 to lock the arms 69 and 70 in such re-located position.

It will be apparent from the foregoing that in machining the end of a tube such as 86 the following operations take place. Assuming first that a tube 86, which has not been machined on either end, is to be machined, the air pressure is first released from the cylinder 50 and the spring 57 moves the piston 58, and consequently the block 44, to the left, as viewed in Figs. 3 and 4, away from the block 30. Assuming that the member 78 has been adjusted so that the outer or upper end of the tube 86 will rest against the pin 90, the tube 86 is then inserted in one of the depressions 61 with its lower end in proper position relative to the depression 62 so as to be completely machined by the cutter 63, and the air is then applied to the cylinder 50, thus causing the block 44 to move up towards the block 30 and clamp the tube 86 in the corresponding depressions 61. The cam 91 is then turned to clamp the upper end of the tube against the pin 90. The tool 63 is then lowered down through the bushing 76 and through the matching depression 62 and machines the lower end of the tube 86 to its required shape and contour as well as at the proper angle with respect to the axis of the tube 86. Assuming now that we are completely machining but one tube 86 at a time, the air on the cylinder 50 is released, thus permitting the blocks 44 and 30 to separate, and the tube 86 is removed and reversed end for end, the lower end, which has been machined, now being positioned upwardly and now being considered as the upper end. The nut 80 is now loosened and the member 78 is moved downwardly in the slot 77 and the bar 81 is rotated to bring its axis to the correct angle with respect to the axis of the depression 62, and the member 78 is moved sufficiently to bring the bar 81 at the correct distance from the point of intersection of the depression 62 and the depression 61 in which the lower end of the tube 86 is received. The nuts 80 and 85 are then tightened up to clamp the member 78 and bar 81 in this adjusted position. The upper end of the tube 86 is then placed against the bar 81 and pin 90 with the machined end of the bar 86 fitting the curved surface of the bar 81. The cam 91 is then operated to clamp the tube 86 against the pin 90. Air is then admitted to the cylinder 50, thus causing the blocks 44 and 30 to clamp the lower end of the tube 86 between them and the tool 63 is then again passed downwardly through the bushing 76 and depression 62 to machine the end of the tube 86. The tube is now completely machined and ready for assembly and welding or abrasing in place.

While I have described the operation upon a single tube, it will be apparent that in actual operation a plurality of tubes such as 86, each having one end thereof which must be machined to the same curvature and at the same angle to its axis, will be machined one after the other on one end only and then the machine will be set to machine the opposite ends and all of the tubes will have such opposite ends machined one after the other.

It will also be apparent that with this device the ends of the tubes may be machined with extreme accuracy both as to contour and size, as to angularity with respect to the axis of the tube, and at the correct distance between the curved surfaces at opposite ends of the tube. It also lends itself to ready and quick change in order to machine tubes of different diameters, of different lengths, and to fit tubes of different sizes and at different angles. At the most all that such changes require is replacement of the blocks 30 and 44 by blocks having the required diameter and angularity of recesses therein and possible shifting of the member 78 and replacement of the bar members 81 with similar members of different diameter or arranged at different angles to the axis of their securing stud.

Formal changes may be made in the specific embodiment of the invention described without departing from the spirit and substance of the broad invention, the scope of which is commensurate with the appended claim.

I claim:—

In a device of the type described, a pair of relatively movable central clamping members, matching depressions being provided in said clamping members adapted to receive and clamp one end of a tube therein, an axially movable cutting tool of drill type, supported with its axis in intersecting relation with respect to the axis of one of said depressions, an arm pivotally secured relative to one of said clamping members, means for locking said arm in pivotally adjusted position, a member slidably mounted on said arm, means for clamping said member in slidably adjusted position, and means carried by the last mentioned member for locating the other end of said tube at a predetermined distance from the point of intersection of the axis of said depression and that of said tool and at a predetermined angular relation with respect to the axis of said tool, said locating means comprising a member adapted to contact with a side of said tube and another member engageable with the corresponding end surface of said tube.

MEARL J. CHAPMAN.